(12) United States Patent
Ikabata et al.

(10) Patent No.: US 6,419,741 B1
(45) Date of Patent: *Jul. 16, 2002

(54) CEMENT CLINKER AND CEMENT CONTAINING THE SAME

(75) Inventors: Tatsuo Ikabata; Seiichi Nagaoka; Takanori Yamamoto; Tatsushi Akiyama; Ayaji Yasumoto, all of Osaka (JP)

(73) Assignee: Sumitomo Osaka Cement Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,669

(22) PCT Filed: May 23, 1998

(86) PCT No.: PCT/JP98/02322

§ 371 (c)(1),
(2), (4) Date: Nov. 23, 1999

(87) PCT Pub. No.: WO98/54106

PCT Pub. Date: Dec. 3, 1998

(30) Foreign Application Priority Data

| May 27, 1997 | (JP) | ............................................. | 9-137254 |
| Mar. 30, 1998 | (JP) | ............................................. | 10-84796 |
| Mar. 31, 1998 | (JP) | ............................................. | 10-85357 |
| Mar. 31, 1998 | (JP) | ............................................. | 10-86682 |

(51) Int. Cl.$^7$ .............................. C04B 7/02; C04B 7/19; C04B 28/04; C04B 18/08

(52) U.S. Cl. ....................... 106/739; 106/705; 106/709; 106/713; 106/714; 106/772; 106/789

(58) Field of Search ............................... 106/705, 739, 106/709, 713, 714, 772, 789

(56) References Cited

U.S. PATENT DOCUMENTS 4,028,126 A * 6/1977 Mori et al. .................. 106/749
5,356,472 A * 10/1994 Odler ........................ 106/734
5,851,282 A * 12/1998 Odler ........................ 106/733

FOREIGN PATENT DOCUMENTS

| JP | 02-229743 | * | 9/1990 |
| JP | 06-080456 | * | 3/1994 |

* cited by examiner

Primary Examiner—Anthony Green
(74) Attorney, Agent, or Firm—Arent Fox Kintner Plotkin & Kahn

(57) ABSTRACT

The present invention relates to an improvement in cement for use in concrete of high strength and high flowability, mass concrete, shrinkage compensating concrete or concrete of high resistibility which are employed in the field of engineering and architecture or as building material through incremental launching method or wet formation. When the ratio of $Al_2O_3$ to $Fe_2O_3$ is regulated to a value of 0.05 to 0.62, the strength of concrete of high strength and high flowability can further be improved, and heat of hydration can be prevented, while improving the flowability of cement and maintaining a long-term strength thereof.

9 Claims, 10 Drawing Sheets

Relation between IM and (Heat of hydration/compressive strength of mortar)

($C_3S$ approximately 15 % by weight)

Relation between IM and (Heat of hydration/compressive strength of mortar)

($C_3S$ approximately 35 % by weight)

Relation between IM and (Heat of hydration/compressive strength of mortar)

($C_3S$ approximately 55 % by weight)

Relation between IM and Mortar Flow
($C_3S$ approximately 15 % by weight)

Relation between IM and Pad Area
($C_3S$ approximately 15 % by weight)

Relation between IM and Mortar Flow
($C_3S$ approximately 35 % by weight)

Relation between IM and Pad Area
($C_3S$ approximately 35 % by weight)

Relation between IM and Mortar Flow
($C_3S$ approximately 55 % by weight)

Relation between IM and Pad Area
($C_3S$ approximately 55 % by weight)

CEMENT CLINKER AND CEMENT CONTAINING THE SAME

TECHNICAL FIELD

The present invention relates to cement clinker and cement containing the cement clinker, and more particularly to an improvement in cement for use in concrete of high strength and high flowability, mass concrete, shrinkage compensating concrete or concrete of high resistibility which are employed in the field of engineering and architecture or as building material through incremental launching method or wet formation of cement slurry.

BACKGROUND ART

Accompanying promotion of rationalization and energy saving in the field of construction and working techniques in these years, needs for cement of large variety and complexity are increasing, and such cement is being applied to concrete of high strength and high flowability for use in high-rise reinforced concrete buildings or buildings of concrete filled steel tubular column (CFT). Such cement is also applied to so-called mass concrete for use in concrete dams or concrete buildings of large sized members.

In order to obtain concrete of high strength, the water cement ratio is required to be decreased which results in an increase in viscosity of the concrete and a loss in flowability which in turn leads to a drawback in that the workability may be degraded, for instance, the pumpability may be degraded.

Further, a decrease in water cement ratio results in an increase in the amount of cement and thus causes an increase in calorific value at the time of hydration reaction, whereby a drawback is presented in that the strength development of the structure decreases by the effect of thermal hysteresis of high temperature.

Due to these drawbacks, it is generally the case that normal portland cement can only be used at a specified concrete strength of not more than 45 N/mm$^2$ when employed for constructing high-rise reinforced concrete buildings or CFT buildings. In other words, in order to achieve a specified concrete strength of approximately 60 N/mm$^2$, the water cement ratio needs to be decreased to approximately 30%, which, however, results in a remarkably high viscosity of concrete and a loss in flowability so that the pumpability may be degraded.

Further, when using blended cement, the viscosity of concrete becomes lower than that of normal portland cement when both are prepared employing the same water cement ratio. However, since the strength development of the blended cement is inferior to that of normal portland cement, to obtain equivalent strength, it is required to set a lower water cement ratio for the blended cement than that of normal portland cement. This, in turn, results in an increase in viscosity of concrete with no sufficient flowability being maintained. Consequently, such blended cement can be used to obtain only a level of strength equivalent to that of normal portland cement.

In contrast to that, when using low-heat portland cement, the viscosity of concrete becomes lower than that of normal portland cement when both are prepared employing the same water cement ratio, and their strength developments are equal to each other. Thus, it is capable to pump the low-heat portland cement by a pump in a strength region being higher than that of normal portland cement, and more particularly, at a specified concrete strength of up to approximately 60 N/mm$^2$.

The use of low-heat portland cement is desirable also in view of the decrease in the calorific value of hydration.

However, even by employing low-heat portland cement, the viscosity can still not be sufficiently decreased, and when the specified concrete strength is set to be as high as approximately 80 N/mm$^2$ (approximately 25% in a water cement ratio), its viscosity is remarkably increased. Therefore, it can not be pumped by using a general pump and types of pumps and conditions for the pumping are limited.

Low-heat portland cement presents an additional drawback in that its initial strength is lower than those of normal portland cement or blast-furnace slag cement. In order to solve this drawback, measures are taken in that the fineness as well as the amount of contained $SO_3$ are increased for the purpose of improving the initial strength.

However, while an increase in the fineness and the amount of $SO_3$ contributes to improvements in strength, it simultaneously results in a drawback of increasing the calorific value of hydration and of decreasing the flowability of cement.

In any case, in order to further improve cement of high strength and high flowability in strength, it is required to improve the flowability of the whole binder including cement, to further decrease the unit water content while maintaining the flowability of concrete, or to restrict the calorific value of hydration of the whole binder including cement to improve the strength development of the binder.

However, flowability and strength are essentially conflicting with each other, and there exists a relationship between these that if one is improved, the other is degraded. Therefore, it is not easy to solve these two subjects simultaneously. In addition, it is difficult to achieve an additional subject of decreasing the calorific value of hydration, and it had not been possible by the prior art to solve all of these subjects.

It should be noted that various types of concrete of high flowability and high strength are being used in these years, and while these kinds of concrete exhibit superior characteristics, they also present a drawback in that they increase the autogenious shrinkage (phenomenon in which a volumetric decrease occurs after initial setting of cement by the hydration reaction) thereof.

On the other hand, in case of a concrete member having a large sectional area, the heat of hydration of the cement member is accumulated in the proximity of its center to result in a rise of internal temperature. During its temperature rising process or cooling process, a considerable temperature difference occurs between the exterior (portions coming into contact with open air) and interior of the placed concrete and causes partial strains, whereby so-called thermal cracks are apt to occur.

In case such thermal cracks are likely to occur, it needs to be treated as mass concrete in terms of design and working.

While there are various methods of preventing thermal cracks in mass concrete, the use of cement of low calorific value is considered to be most effective and economical.

An example of such cement of low calorific value is blended cement in which ground granulated of blast-furnace slag and/or fly ash are admixed to portland cement by huge amounts. However, this blended cement presents a drawback in that the appearance of initial strength is small and thus results in delays in removal of forms or in inferiority in view of resistibility.

Low-heat portland cement is employed in order to solve these problems, but since such low-heat portland cement is still not capable of sufficiently decreasing the calorific value, it can not exhibit satisfactory effects in preventing thermal cracks.

The problem of autogenious shrinkage does also apply to mass concrete. That is, instances are reported in which cracks occurred which can not be simply explained by the reason accompanying the above described temperature differences, and it is pointed out that it is possible that autogenious shrinkage largely influences the occurrence of such cracks.

DISCLOSURE OF INVENTION

It is an object of the present invention to solve the problem of preventing heat of hydration simultaneously with improving the flowability of cement and maintaining a long-term strength thereof in order to further improve concrete of high strength and high flowability in strength.

It is another object of the present invention to provide cement for concrete of high strength and high flowability that exhibits high flowability and low viscosity at low water cement ratio, high strength development even after receiving thermal hysteresis, and a low amount of autogenious shrinkage.

It is still another object of the present invention to provide cement for mass concrete that exhibits superior effects of preventing cracks owing to thermal cracks and autogenious shrinkage.

In order to achieve these objects, the present invention is characterized in that the amount of $Al_2O_3$ and $Fe_2O_3$ contained in cement clinker are set to be 0.05 to 0.62 by $Al_2O_3/Fe_2O_3$ ratio.

It is known that $3CaO.Al_2O_3$ (hereinafter referred to as "$C_3A$") in cement exhibits high hydration reactivity, high heat of hydration and large autogenious shrinkage amounts. Therefore, when manufacturing moderate heat portland cement or low-heat portland cement, the amount of contained $C_3A$ is decreased to approximately 2 to 4% by weight as compared with 9% by weight contained in normal portland cement.

The only interstitial material calculated by the Bogue calculation when $Al_2O_3/Fe_2O_3$ ratio (hereinafter referred to as "IM" of the cement clinker is approximately 0.62 is ferrite ($C_4AF$), and no $C_3A$ is calculated on estimatory basis.

By further decreasing IM, the interstitial material changes to ferrite of $C_6AF_2$ composition and further to that of $C_2F$ composition.

By omitting $C_3A$ which exhibits high hydration reactivity, high calorific value of hydration, high adsorption amount to chemical admixture when employed as concrete as well as largest amount of autogenious shrinkage, it is possible to improve the flowability and to decrease the amount of the autogenious shrinkage.

As a further advantage, accompanying the change of the ferrite composition from $C_4AF$ to $C_6AF_2$ by the decrease of IM, cement decreases in the heat of hydration and improves in the flowability thereof.

Since $C_4AF$ has an amount of autogenious shrinkage second as large as that of $C_3A$, and the autogenious shrinkage of $C_6AF_2$ is relatively small, the amount of autogenious shrinkage is further decreased by the above changes in composition.

It has become apparent by the present invention that changes in ferrite composition by decreasing IM in the cement clinker is a more effective measure to solve the subjects than obtained by the effect of simply omitting $C_3A$.

It should be noted the elongation of compressive strength of mortar is insufficient in case the interstitial material is ferrite of $C_2F$ composition (IM: in the proximity of 0), so that the lower limit value of IM has been set to 0.05. Possible reasons for this are influences on $2CaO.SiO_2$ (hereinafter referred to as "$C_2S$") due to changes in solid solution rate of minor elements and also large sized crystals of $C_2S$ owing to a decrease in $Al_2O_3$ amount in the cement clinker whereby $C_2S$ is hard to be ground during the grinding process to cement.

In the present invention, it is preferable to set the amount of contained $C_2S$ to 35 to 75% by weight.

When the amount of $C_2S$ contained in the cement clinker is less than 35% by weight, the amount of contained $3CaO.SiO_2$ (hereinafter referred to as "$C_3S$") relatively increases, whereby the heat of concrete increases, the strength development after receiving thermal hysteresis decreases, and the strength per amount of adiabatic temperature rise (strength per rise of adiabatic temperature by 1° C.) of concrete does not become large than compared to that of low-heat portland cement.

On the other hand, when the amount of $C_2S$ exceeds 75% by weight, the strength development speed is delayed, and the specified strength can not be obtained. Further, the strength per amount of adiabatic temperature rise of concrete does not become larger than that of low-heat portland cement.

The strength per amount of adiabatic temperature rise for concrete is employed as an index of resistibility of concrete against thermal cracks.

The resistibility of concrete against thermal cracks becomes larger when the ratio of tensile strength to thermal stress of concrete becomes larger.

That is, the resistibility against thermal cracks becomes larger when the thermal stress becomes smaller, provided that the strength is identical, and when the tensile strength becomes larger, provided that the thermal stresses are identical.

When conditions for building are identical, the developmental stress becomes larger when the calorific value of concrete becomes larger.

While detailed evaluation of resistibility of concrete against thermal cracks needs to be performed by thermal stress analysis employing, for instance, the finite element method; but when comparing the resistibility of concrete itself against thermal cracks, the strength (compression) per rise of adiabatic temperature by 1° C. is simply employed as an index.

The reason for this is that tensile strength and compressive strength are correlated to each other.

It is further possible in the present invention to include 2 to 25% by weight of fly ash of a particles size not more than 20 μm in a cement compound containing a cement clinker in which the amount of $Al_2O_3$ and $Fe_2O_3$ are 0.05 to 0.62 in $Al_2O_3/Fe_2O_3$ ratio.

The reason why the particle size of fly ash, if ever included, should not be more than 20 μm is that fly ash of a particle size of not more than 20 μm can be filled between cement particles whereby the flowability improves without increasing the viscosity due to filler effect.

The reason for setting the admixing amount of fly ash to 2 to 25% by weight is that no sufficient filler effect can be obtained in case this mixing amount of fly ash is less than 2% by weight; on the other hand, the strength development speed is delayed so that no specified strength can be obtained in case this amount exceeds 25% by weight.

Further, it is also possible to admix, instead of fly ash, 10 to 60% by weight of ground granulated of blast-furnace slag whose specific surface area by blaine is 5,000 to 10,000 cm$^2$/g.

When the specific surface area by blaine of the blast-furnace slag powder is not less than 5,000 cm$^2$/g, the blast-furnace slag is filled between the cement particles whereby the flowability improves without increasing the viscosity due to the filler effect. On the other hand, when it exceeds 10,000 cm$^2$/g, the amount of dispersing agent used for obtaining a specified workability of concrete is considerably increased and is thus uneconomical.

When the admixing amount of blast-furnace slag powder is less than 10% by weight, no sufficient filler effect can be obtained, and the strength development speed is delayed so that no specified strength can be obtained when this amount exceeds 60% by weight.

It is also possible to include dispersing agent in the present invention.

Dispersing agent is used for the purpose of securing the flowability by dispersing cement particles at low water cement ratios so as to decrease the yield value of the cement paste. The composition of the dispersing agent is not especially limited, provided that it is capable of dispersing cement particles, and any commercially available high-range water reducing agents or high-range AE water reducing agents may be employed.

When applying the cement of the present invention to concrete of high strength and high flowability, the admixing proportion of cement, water, aggregates and dispersing agents are not especially limited. However, it is most effective when the cement of the present invention is applied to concrete of high strength and high flowability having a water cement ratio not more than approximately 30% at which the viscosity of concrete remarkably increases.

As discussed so far, since the clinker composition has been set to be 0.05 to 0.62 by $Al_2O_3/Fe_2O_3$ ratio, the present invention has made it possible to solve the problem of preventing heat of hydration while improving the flowability of cement and maintaining a long-term strength thereof which the prior art was not capable of solving. Consequently, conventional problems of low-heat portland cement and problems which occurred when adding, for instance, fly ash can be solved, and there can be provided a clinker composition suitable for concrete of high strength and high flowability.

Further, there can be obtained concrete of high strength and high flowability which exhibits high flowability and low viscosity at low water cement ratio and which also exhibits high strength development even after receiving thermal hysteresis.

Accordingly, it becomes possible to work with concrete of high strength and high flowability with a specified concrete strength of approximately 80 N/mm$^2$ without the limitations in types of pumps or pumping conditions. In addition, there are no restrictions for aggregates capable of being used. Whereby, concrete of high strength and high flowability can easily be manufactured.

The amount of autogenious shrinkage can also be decreased, with the result that the occurrence of cracks accompanying the autogenious shrinkage can be prevented, and the resistibility can be improved. Thus, functions of concrete of high strength and high flowability can be highly promoted.

Further, resistibility against thermal cracks in mass concrete structures is improved, with the result that it becomes possible to decrease the amount of any other measures for preventing thermal cracks which had been generally used in a combining manner. Whereby, thermal cracks can be decreased in an economical way.

BEST MODE FOR CARRYING OUT THE INVENTION

Figure 1:
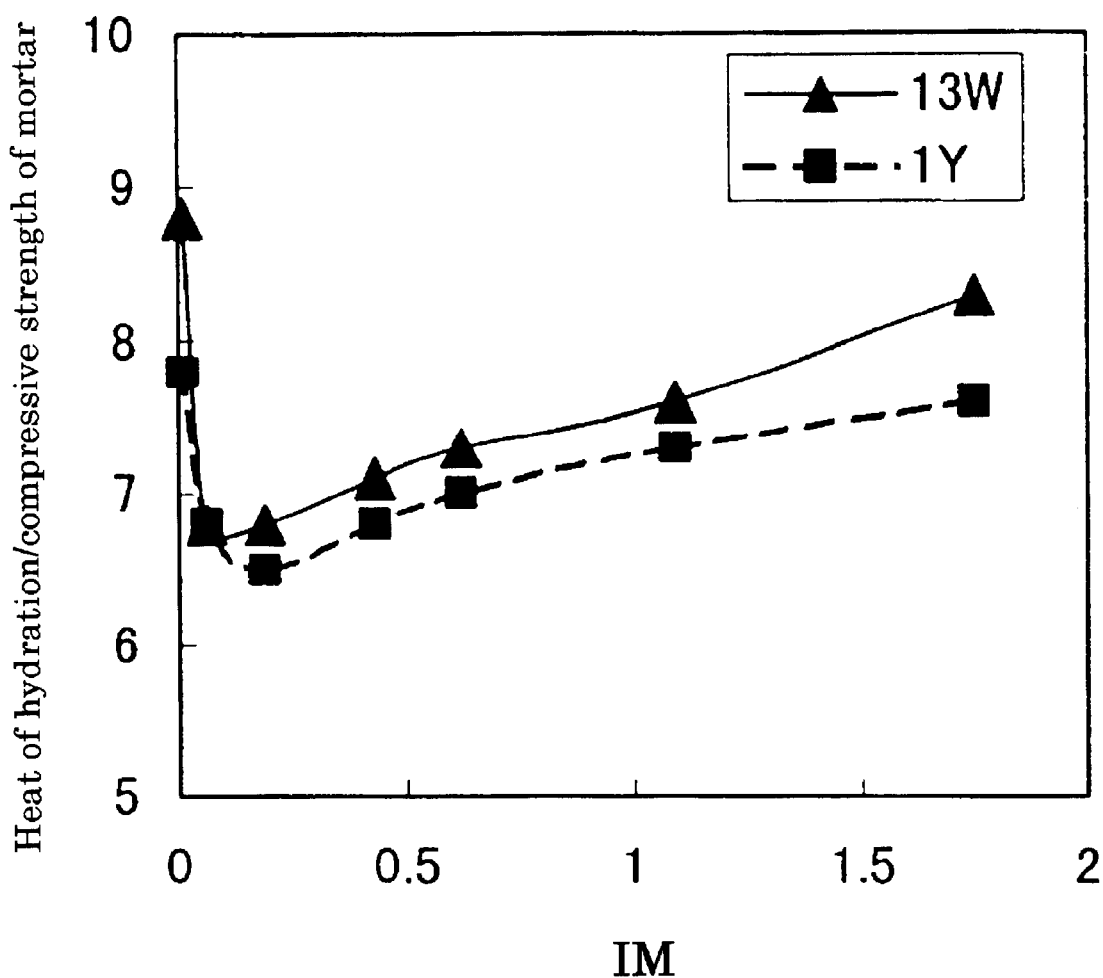
FIG. 1 is a graph showing a relation between IM and heat of hydration/compressive strength of mortar ($C_3S$ approximately 15% by weight).

Embodiments of the present invention will be explained hereinafter.

TEST EXAMPLE 1

Crude materials of cement clinker were admixed by using a test specimen, fired within an electric furnace at 1,450° C. for 1 hour, taken out from the electric furnace and rapidly cooled in open air, whereby clinker having compositions of Embodiments 1 to 12 and clinker having compositions of Comparative Examples 1 to 9 have been obtained as shown in Tables 1 to 3.

TABLE 1

| | Chemical Composition of Clinker (% by weight) | | | | | |
|---|---|---|---|---|---|---|
| | $SiO_2$ | $Al_2O_3$ | $Fe_2O_3$ | CaO | MgO | $Na_2O$ |
| Comparative Example 1 | 28.0 | 4.2 | 2.4 | 63.5 | 1.0 | 0.38 |
| Comparative Example 2 | 27.6 | 3.8 | 3.5 | 63.4 | 1.0 | 0.36 |
| Embodiment 1 | 28.0 | 2.9 | 4.7 | 62.7 | 1.0 | 0.40 |
| Embodiment 2 | 27.9 | 2.3 | 5.4 | 62.5 | 1.0 | 0.42 |
| Embodiment 3 | 27.9 | 1.3 | 6.8 | 62.3 | 1.0 | 0.38 |
| Embodiment 4 | 27.7 | 0.5 | 7.9 | 62.0 | 1.0 | 0.40 |
| Comparative Example 3 | 27.8 | 0.1 | 8.3 | 61.7 | 1.0 | 0.52 |

TABLE 2

Chemical Composition of Clinker (% by weight)

|  | SiO$_2$ | Al$_2$O$_3$ | Fe$_2$O$_3$ | CaO | MgO | Na$_2$O |
|---|---|---|---|---|---|---|
| Comparative Example 4 | 25.4 | 4.7 | 2.7 | 65.0 | 1.2 | 0.40 |
| Comparative Example 5 | 25.3 | 4.0 | 4.0 | 64.4 | 1.2 | 0.39 |
| Embodiment 5 | 25.5 | 3.2 | 5.2 | 63.9 | 1.2 | 0.38 |
| Embodiment 6 | 25.5 | 2.6 | 6.0 | 63.7 | 1.2 | 0.41 |
| Embodiment 7 | 25.5 | 1.5 | 7.5 | 63.3 | 1.2 | 0.42 |
| Embodiment 8 | 25.4 | 0.5 | 8.9 | 63.0 | 1.2 | 0.37 |
| Comparative Example 6 | 25.5 | 0.2 | 9.3 | 62.9 | 1.2 | 0.43 |

TABLE 3

Chemical Composition of Clinker (% by weight)

|  | SiO$_2$ | Al$_2$O$_3$ | Fe$_2$O$_3$ | CaO | MgO | Na$_2$O |
|---|---|---|---|---|---|---|
| Comparative Example 7 | 23.5 | 5.1 | 2.9 | 66.3 | 1.3 | 0.36 |
| Comparative Example 8 | 23.6 | 4.2 | 4.3 | 65.7 | 1.3 | 0.42 |
| Embodiment 9 | 23.7 | 3.3 | 5.4 | 65.3 | 1.3 | 0.38 |
| Embodiment 10 | 23.8 | 2.7 | 6.2 | 65.1 | 1.3 | 0.40 |
| Embodiment 11 | 23.7 | 1.7 | 7.6 | 64.8 | 1.3 | 0.43 |
| Embodiment 12 | 23.7 | 0.6 | 9.0 | 64.3 | 1.3 | 0.38 |
| Comparative Example 9 | 23.5 | 0.2 | 9.6 | 64.5 | 1.3 | 0.41 |

To the clinker having compositions of Embodiments 1 to 12 and Comparative Examples 1 to 9, gypsum was added by an amount of 2% by weight by SO$_3$ conversion, and by mixing and crushing by using a test mill, 21 types of cement having different C$_3$S amounts and IM were adjusted.

Their mineral compositions are shown in Tables 4 to 6.

TABLE 4

|  | Mineral Composition (% by weight) | | |
|---|---|---|---|
|  | C$_3$S | C$_2$S | IM |
| Comparative Example 1 | 14 | 70 | 1.75 |
| Comparative Example 2 | 18 | 66 | 1.09 |
| Embodiment 1 | 16 | 68 | 0.62 |
| Embodiment 2 | 17 | 67 | 0.43 |
| Embodiment 3 | 16 | 68 | 0.19 |
| Embodiment 4 | 17 | 67 | 0.06 |
| Comparative Example 3 | 16 | 68 | 0.01 |

TABLE 5

|  | Mineral Composition (% by weight) | | |
|---|---|---|---|
|  | C$_3$S | C$_2$S | IM |
| Comparative Example 4 | 36 | 46 | 1.74 |
| Comparative Example 5 | 37 | 44 | 1.00 |
| Embodiment 5 | 37 | 45 | 0.62 |
| Embodiment 6 | 37 | 45 | 0.43 |
| Embodiment 7 | 36 | 46 | 0.20 |
| Embodiment 8 | 36 | 46 | 0.06 |
| Comparative Example 6 | 35 | 47 | 0.02 |

TABLE 6

|  | Mineral Composition (% by weight) | | |
|---|---|---|---|
|  | C$_3$S | C$_2$S | IM |
| Comparative Example 7 | 53 | 27 | 1.76 |
| Comparative Example 8 | 54 | 27 | 0.98 |
| Embodiment 9 | 55 | 26 | 0.61 |
| Embodiment 10 | 54 | 27 | 0.44 |
| Embodiment 11 | 54 | 27 | 0.22 |
| Embodiment 12 | 53 | 28 | 0.07 |
| Comparative Example 9 | 56 | 25 | 0.02 |

The fineness of cement has been set to 2,900 to 3,000 cm$^2$/g at specific surface area by blaine.

The heat of hydration and compressive strength of mortar have been measured for each of the clinker of Embodiments 1 to 12 and Comparative Examples 1 to 9, and their ratios have been calculated.

Measuring of heat of hydration has been performed in compliance with JIS R5203-1995.

Measuring of compressive strength of mortar has been performed in compliance with JIS R5201-1992.

The measured results are shown in Tables 7 to 9.

TABLE 7

|  | Heat of Hydration (J/g) | | | | Compressive Strength of Mortar | | | | Heat of Hydration/ Compressive Strength of Mortar | | | |
|---|---|---|---|---|---|---|---|---|---|---|---|---|
|  | 1W | 4W | 13W | 1Y | 1W | 4W | 13W | 1Y | 1W | 4W | 13W | 1Y |
| Comparative Example 1 | 176 | 252 | 307 | 334 | 4.7 | 18.6 | 36.8 | 43.8 | 37.4 | 13.5 | 8.3 | 7.6 |
| Comparative Example 2 | 172 | 230 | 285 | 323 | 4.2 | 15.2 | 37.3 | 44.8 | 41.0 | 15.1 | 7.6 | 7.3 |

TABLE 7-continued

|  | Heat of Hydration (J/g) | | | | Compressive Strength of Mortar | | | | Heat of Hydration/ Compressive Strength of Mortar | | | |
| --- | --- | --- | --- | --- | --- | --- | --- | --- | --- | --- | --- | --- |
|  | 1W | 4W | 13W | 1Y | 1W | 4W | 13W | 1Y | 1W | 4W | 13W | 1Y |
| Embodiment 1 | 164 | 227 | 283 | 315 | 3.8 | 16.5 | 38.7 | 44.0 | 43.2 | 13.8 | 7.3 | 7.0 |
| Embodiment 2 | 146 | 218 | 260 | 298 | 4.5 | 15.2 | 36.4 | 43.6 | 32.4 | 14.3 | 7.1 | 6.8 |
| Embodiment 3 | 139 | 200 | 240 | 284 | 4.6 | 14.7 | 35.5 | 43.4 | 30.2 | 13.6 | 6.8 | 6.5 |
| Embodiment 4 | 136 | 192 | 228 | 275 | 4.5 | 13.5 | 33.6 | 40.5 | 30.2 | 14.2 | 6.8 | 6.8 |
| Comparative Example 3 | 139 | 189 | 222 | 270 | 4.2 | 11.3 | 25.3 | 34.4 | 33.1 | 16.7 | 8.8 | 7.8 |

TABLE 8

|  | Heat of Hydration (J/g) | | | | Compressive Strength of Mortar | | | | Heat of Hydration/ Compressive Strength of Mortar | | | |
| --- | --- | --- | --- | --- | --- | --- | --- | --- | --- | --- | --- | --- |
|  | 1W | 4W | 13W | 1Y | 1W | 4W | 13W | 1Y | 1W | 4W | 13W | 1Y |
| Comparative Example 4 | 219 | 273 | 341 | 358 | 8.3 | 27.3 | 43.8 | 46.9 | 26.4 | 10.0 | 7.8 | 7.6 |
| Comparative Example 5 | 198 | 264 | 335 | 348 | 7.4 | 25.6 | 43.3 | 47.2 | 26.8 | 10.3 | 7.7 | 7.4 |
| Embodiment 5 | 186 | 259 | 318 | 334 | 7.1 | 25.1 | 42.5 | 46.8 | 26.2 | 10.3 | 7.5 | 7.1 |
| Embodiment 6 | 172 | 246 | 301 | 318 | 6.7 | 24.8 | 41.9 | 45.8 | 25.7 | 9.9 | 7.2 | 6.9 |
| Embodiment 7 | 158 | 231 | 279 | 299 | 6.5 | 24.3 | 40.9 | 44.3 | 24.3 | 9.5 | 6.8 | 6.7 |
| Embodiment 8 | 152 | 228 | 271 | 298 | 6.3 | 23.3 | 39.2 | 43.7 | 24.1 | 9.8 | 6.9 | 6.8 |
| Comparative Example 6 | 148 | 223 | 265 | 295 | 6.0 | 21.2 | 34.5 | 38.6 | 24.7 | 10.5 | 7.7 | 7.6 |

TABLE 9

|  | Heat of Hydration (J/g) | | | | Compressive Strength of Mortar | | | | Heat of Hydration/ Compressive Strength of Mortar | | | |
| --- | --- | --- | --- | --- | --- | --- | --- | --- | --- | --- | --- | --- |
|  | 1W | 4W | 13W | 1Y | 1W | 4W | 13W | 1Y | 1W | 4W | 13W | 1Y |
| Comparative Example 7 | 351 | 405 | 430 | 441 | 22.7 | 41.3 | 45.9 | 48.2 | 15.5 | 9.8 | 9.4 | 9.1 |
| Comparative Example 8 | 335 | 390 | 418 | 432 | 21.8 | 40.2 | 45.7 | 49.1 | 15.4 | 9.7 | 9.1 | 8.8 |
| Embodiment 9 | 318 | 375 | 411 | 418 | 21.7 | 39.6 | 46.0 | 48.9 | 14.7 | 9.5 | 8.9 | 8.5 |
| Embodiment 10 | 308 | 356 | 388 | 399 | 21.0 | 38.3 | 44.8 | 48.5 | 14.7 | 9.3 | 8.7 | 8.2 |
| Embodiment 11 | 285 | 343 | 369 | 383 | 20.6 | 37.9 | 43.9 | 47.3 | 13.8 | 9.1 | 8.4 | 8.1 |
| Embodiment 12 | 279 | 335 | 359 | 371 | 19.8 | 36.3 | 42.8 | 45.3 | 14.1 | 9.2 | 8.4 | 8.2 |
| Comparative Example 9 | 263 | 328 | 347 | 359 | 17.5 | 33.7 | 38.5 | 40.3 | 15.0 | 9.7 | 9.0 | 8.9 |

As being apparent also from Tables 7 to 9, the ratio of heat of hydration/compressive strength of mortar is smaller in Embodiments 1 to 12 as compared to those of Comparative Example 1 to 9, and effects of preventing heat of hydration could be recognized.

Figure 2:
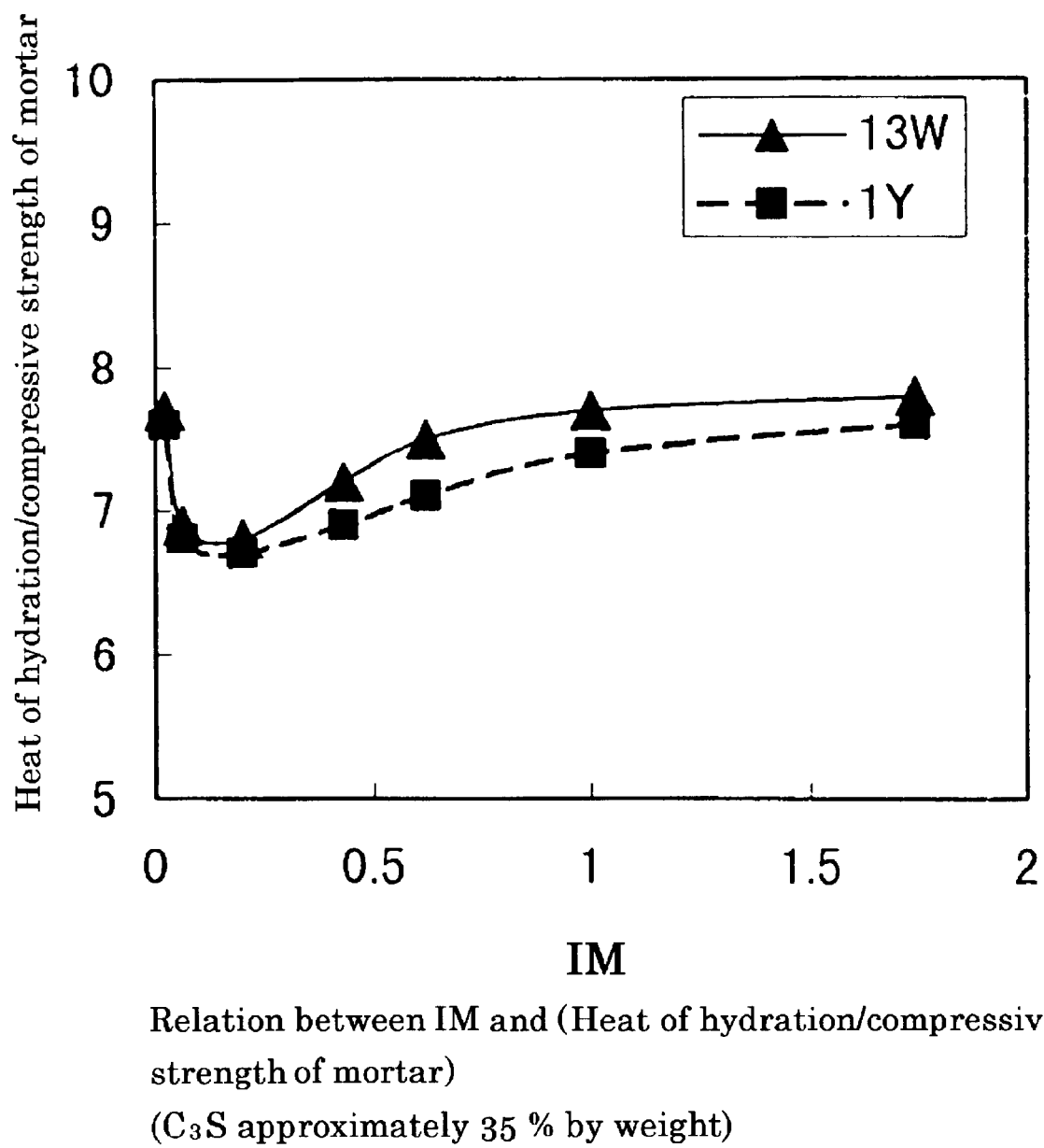
FIG. 2 is a graph showing a relation between IM and heat of hydration/compressive strength of mortar ($C_3S$ approximately 35% by weight).
Figure 3:
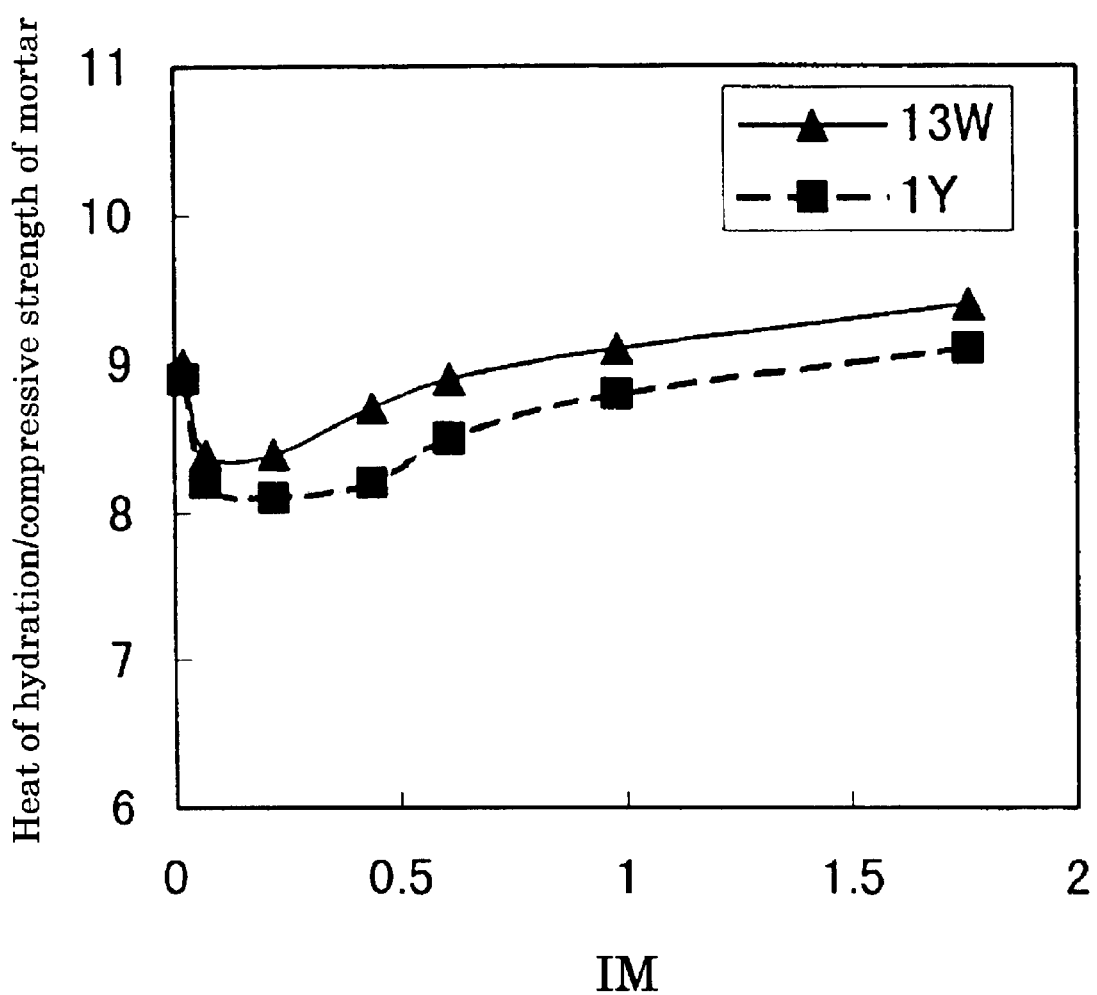
FIG. 3 is a graph showing a relation between IM and heat of hydration/compressive strength of mortar ($C_3S$ approximately 55% by weight).

Especially the ratio of heat of hydration/ compressive strength of mortar of materials aged 13 weeks and 1 year are smaller with IM in the range of 0.05 to 0.62 in each of the cases in which the amount of $C_3S$ were approximately 15% by weight, approximately 35% by weight and approximately 55% by weight, as shown in FIGS. 1 to 3.

Further, the flow and pad area have been measured for Embodiments 1 to 12 and Comparative Examples 1 to 9.
(Method of Measuring Pad Area)

200 g of cement was invested in approximately 10 seconds into a 200 ml beaker with 70 ml of mulling water containing a water reducing agent, intensely stirred for 1 minute 50 seconds with a hand mixer to adjust a paste.

This paste was poured by means of a spoon into a miniature slump cone placed on a plastic plate, and the paste in the miniature slump cone was well stirred by means of a micro-spatula and its surface was leveled. The miniature slump cone was then raised after 3 minutes elapsed from the start of investing cement.

The short diameter and long diameter of the paste extending over the plastic plate was measured to calculate the pad area.
(Method of Measuring Flow)

Measuring of flow values was performed in compliance with JIS R5201-1992.

That is, a sample was filled in a two-layered manner into a flow cone correctly placed on a central position of a surface of a flow table that has been well wiped with a dry cloth. Each layer was respectively rammed by 15 times over the whole surface such that the tip portion of a rammer was put into approximately half the depth of the layer, the defective amount supplemented thereafter, and the surface leveled.

After filling, the flow cone was removed upwardly, subjected to dropping by 15 times in 15 seconds, and the diameter after the expansion of the sample was measured in a direction which was recognized to be maximum and a direction orthogonal thereto, and an average value thereof was expressed by an integral number by units of mm to be set as the flow value.

The measured results are shown in Tables 10 to 12.

TABLE 10

|  | Flow (mm) | Pad Area (cm$^2$) |
|---|---|---|
| Comparative Example 1 | 254 | 41 |
| Comparative Example 2 | 253 | 47 |
| Embodiment 1 | 268 | 65 |
| Embodiment 1 | 270 | 80 |
| Embodiment 1 | 272 | 89 |
| Embodiment 1 | 270 | 92 |
| Comparative Example 3 | 265 | 84 |

TABLE 11

|  | Flow (mm) | Pad Area (cm$^2$) |
|---|---|---|
| Comparative Example 4 | 250 | 43 |
| Comparative Example 5 | 253 | 50 |
| Embodiment 5 | 270 | 66 |
| Embodiment 6 | 273 | 77 |
| Embodiment 7 | 275 | 83 |
| Embodiment 8 | 273 | 87 |
| Comparative Example 6 | 267 | 83 |

TABLE 12

|  | Flow (mm) | Pad Area (cm$^2$) |
|---|---|---|
| Comparative Example 4 | 255 | 38 |
| Comparative Example 5 | 258 | 45 |
| Embodiment 5 | 264 | 62 |
| Embodiment 6 | 275 | 75 |
| Embodiment 7 | 277 | 81 |
| Embodiment 8 | 273 | 88 |
| Comparative Example 9 | 265 | 85 |

Table 10 shows results of Embodiments 1 to 4 and Comparative Example 1 to 3, that is, belite cement in which the amount of contained C$_3$S is approximately 15% by weight.

Figure 4:
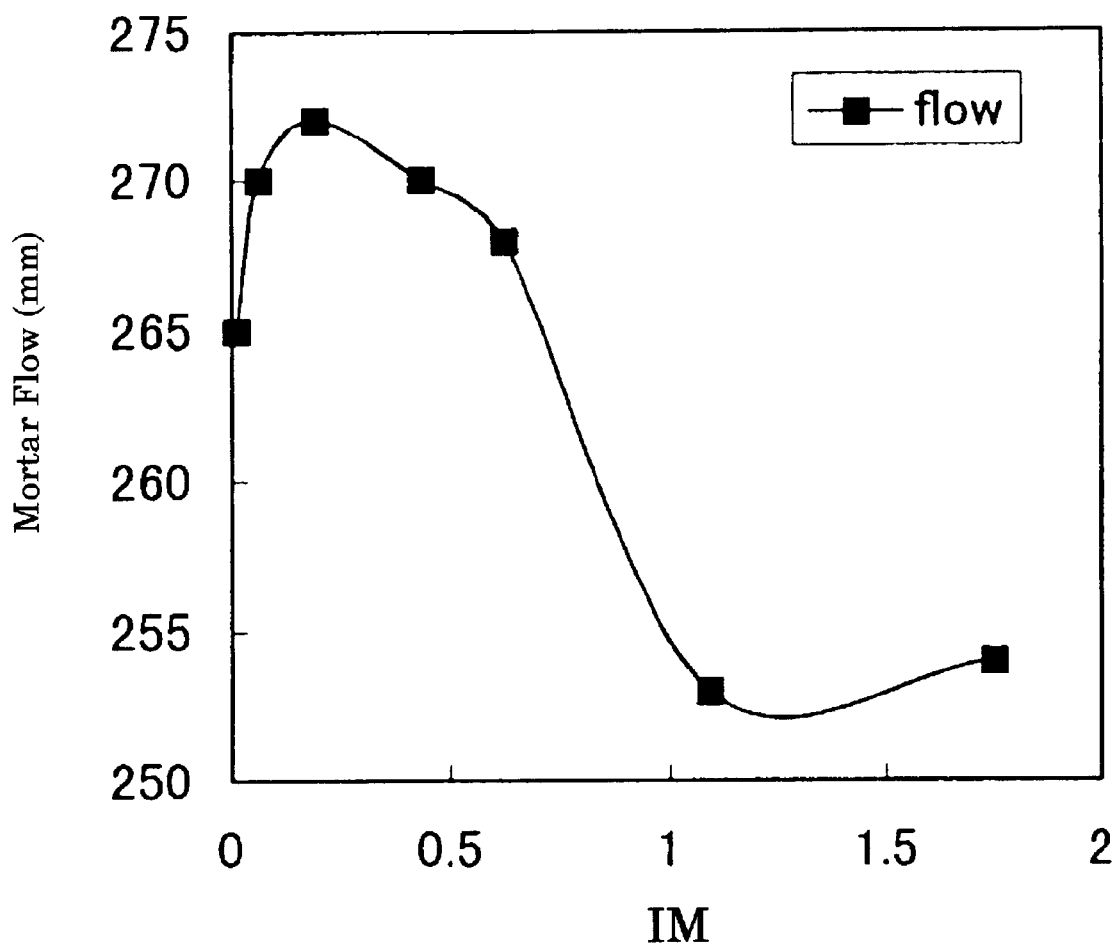
FIG. 4 is a graph showing a relation between IM and mortar flow ($C_3S$ approximately 15% by weight).
Figure 5:
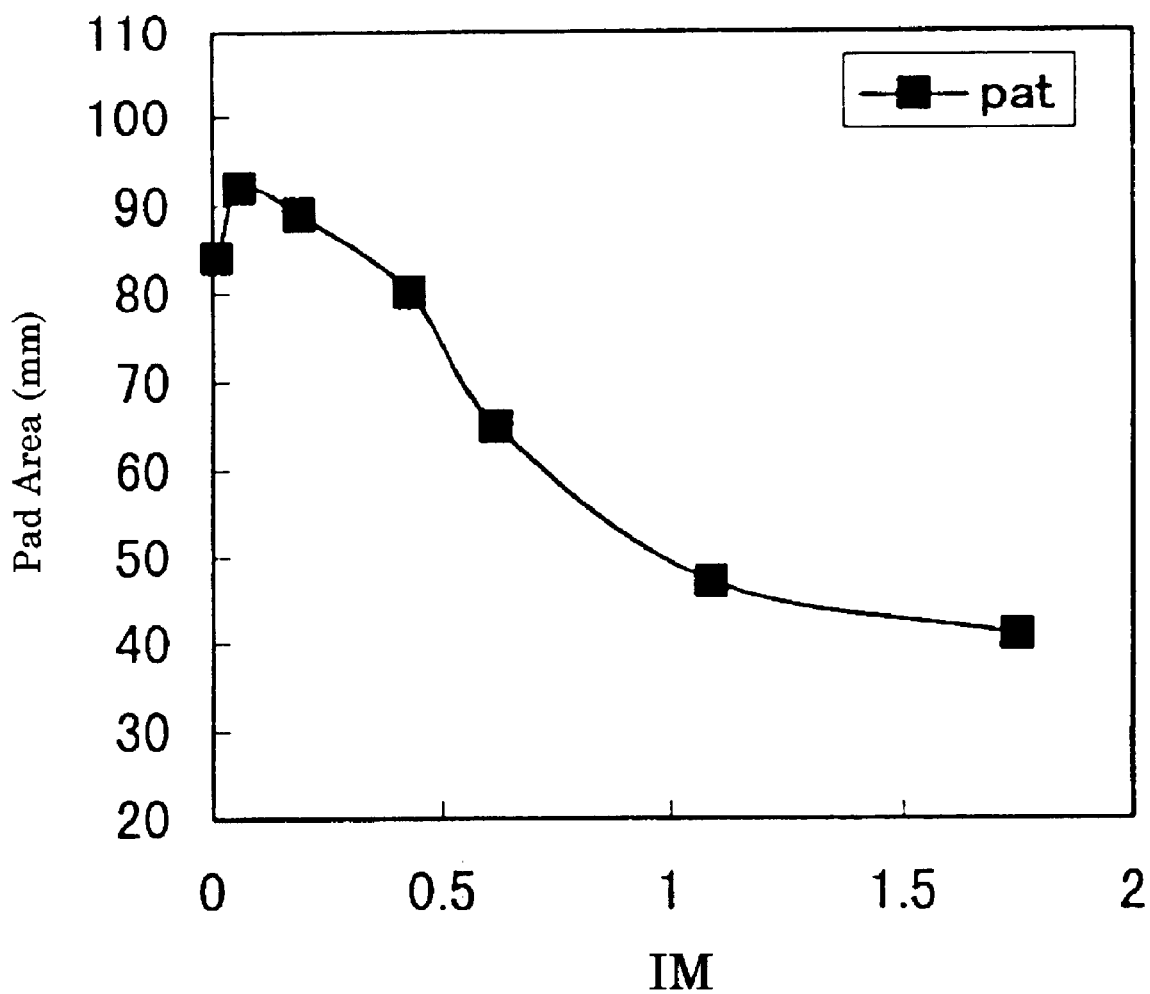
FIG. 5 is a graph showing a relation between IM and pad area ($C_3S$ approximately 15% by weight).

In the region of IM being 0.05 to 0.62, both the mortar flow and pad area became large. This is more accurately shown in FIGS. 4 and 5.

Especially the pad area which is used as an index of flowability when containing a chemical admixture remarkably increased in the proximity of IM being 0.62. Thus, remarkable differences could be seen in Embodiments 1 to 4 and Comparative Examples 1 and 2.

Further, Table 11 shows results of Embodiments 5 to 8 and Comparative Examples 4 to 6, that is, low-heat to moderate heat type cement in which the amount of contained C$_3$S is approximately 35% by weight.

Figure 6:
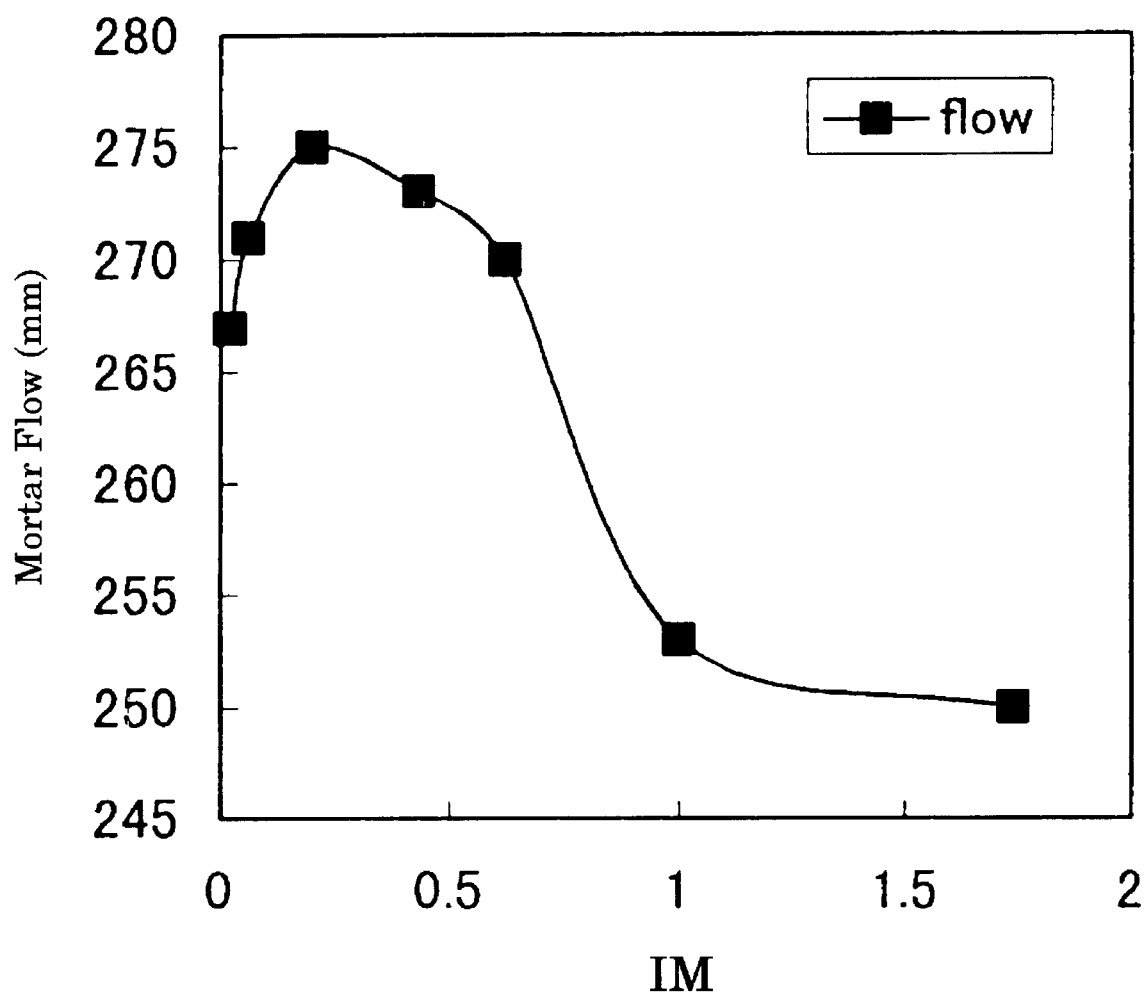
FIG. 6 is a graph showing a relation between IM and mortar flow ($C_3S$ approximately 35% by weight).
Figure 7:
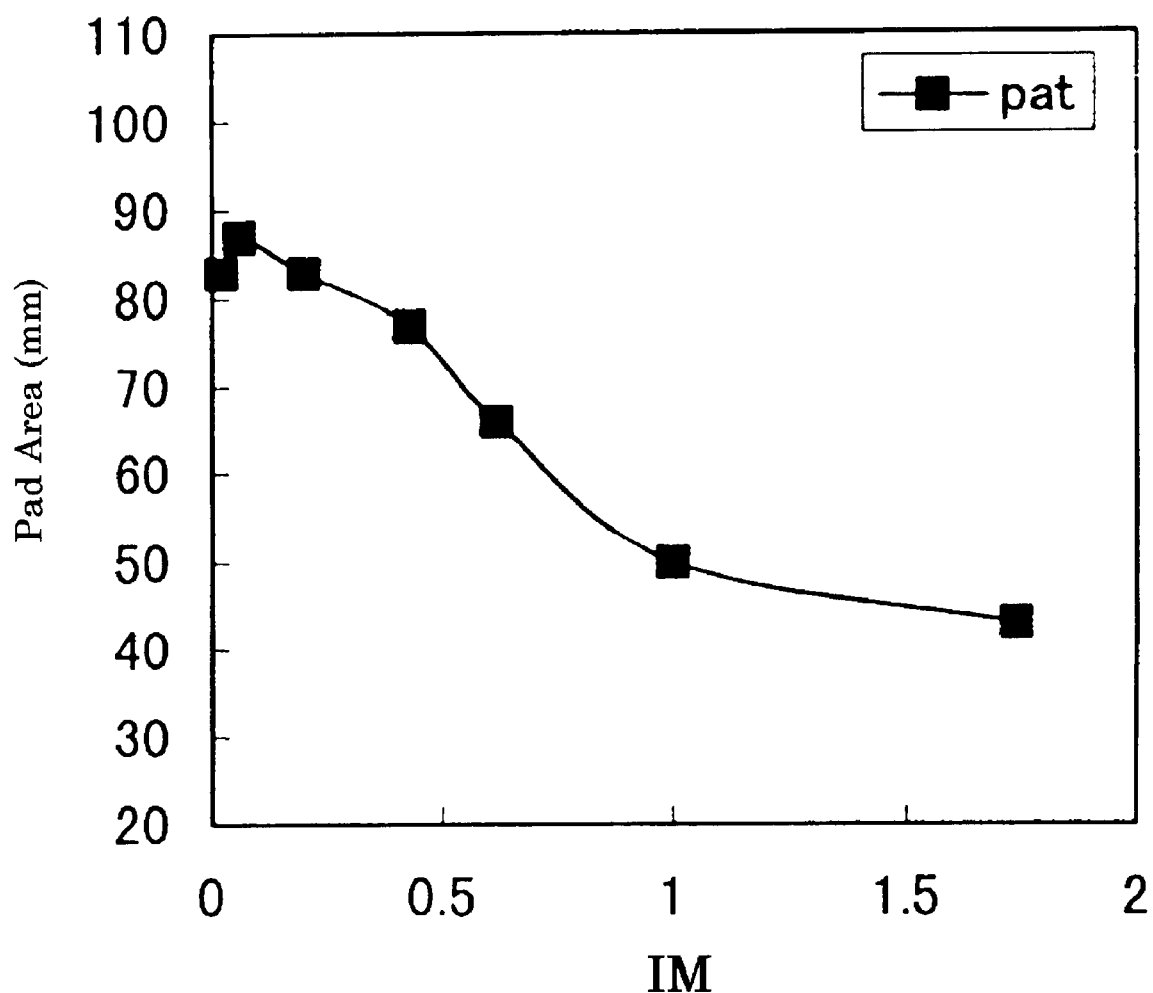
FIG. 7 is a graph showing a relation between IM and pad area ($C_3S$ approximately 35% by weight).

Also in the results of Table 11 (the amount of contained C$_3$S being approximately 35% by weight), both the mortar flow and pad area became larger when IM were in the region of 0.05 to 0.62 as shown in FIGS. 6 and 7, and especially the pad area remarkably increased when IM was in the proximity of 0.62. Thus, remarkable differences could be seen between Embodiments 5 to 8 and Comparative Examples 4 and 5.

Results of normal cement type with the amount of contained C$_3$S being approximately 55% by weight are shown in Embodiments 9 to 12 and Comparative Examples 7 to 9 in Table 12.

Figure 8:
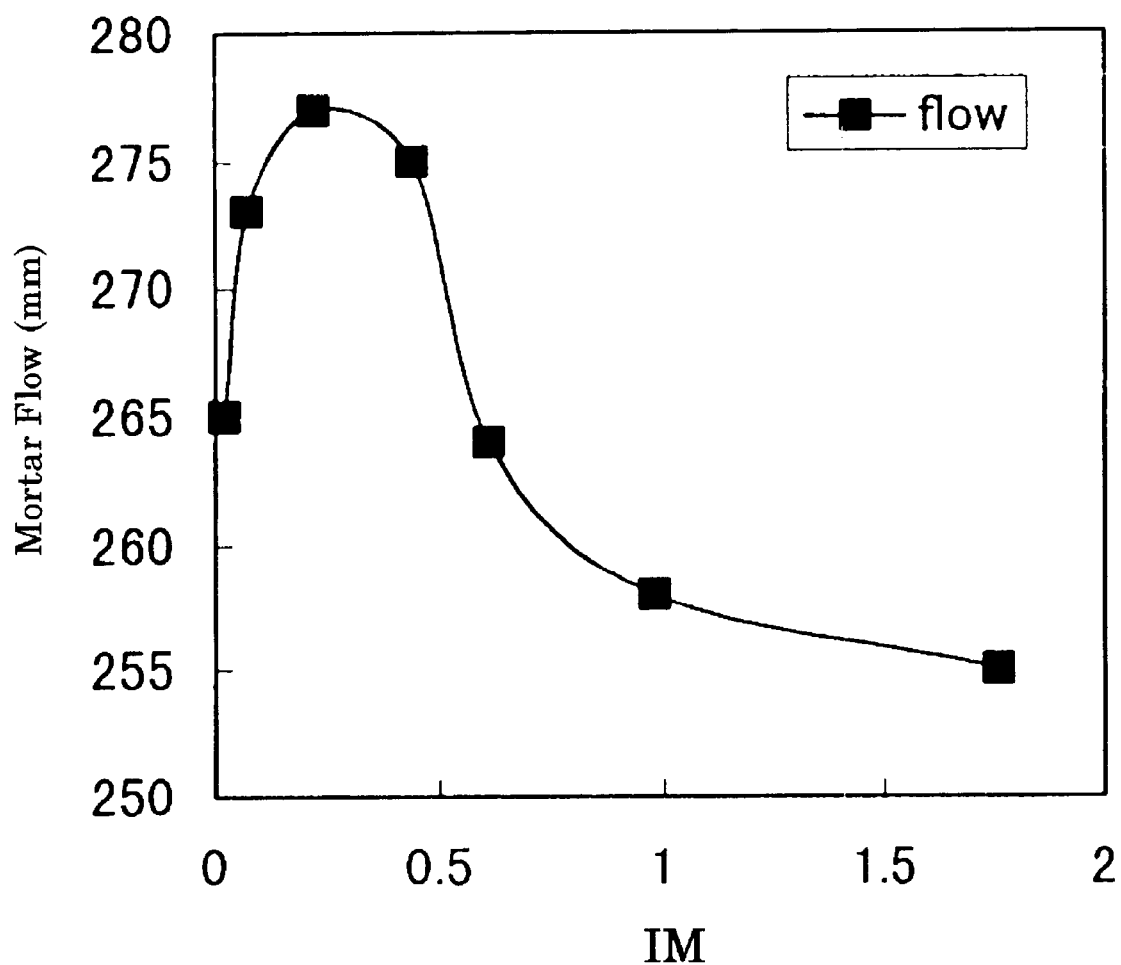
FIG. 8 is a graph showing a relation between IM and mortar flow ($C_3S$ approximately 55% by weight).
Figure 9:
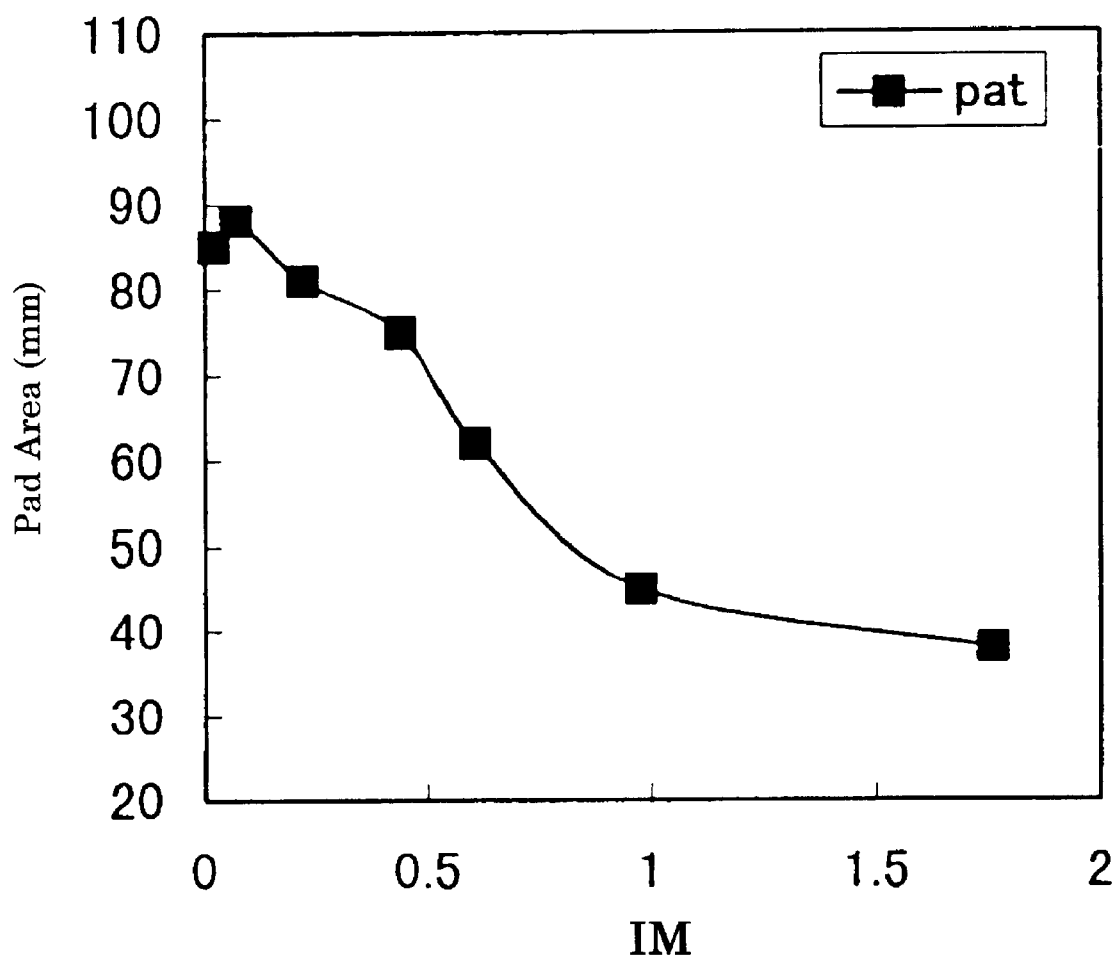
FIG. 9 is a graph showing a relation between IM and pad area ($C_3S$ approximately 55% by weight).

Also in the results of Table 12 (the amount of contained C$_3$S being approximately 55% by weight), both the mortar flow and pad area became larger when IM were in the region of 0.05 to 0.62 as shown in FIGS. 8 and 9, and especially the pad area remarkably increased when IM was in the proximity of 0.62. Thus, remarkable differences could be seen between Embodiments 9 to 12 and Comparative Examples 7 and 8.

TEST EXAMPLE 2

By using a material including cement, fine aggregate, coarse aggregate, chemical admixture and water, concrete of water cement ratios of 30%, 25%, and 20% as well as unit water content of 175 kg/m$^3$ were mixed by using a forced mixer with double shafts, its apparent viscosity was measured through two-point method by employing a rotary viscometer, and its compressive strength was measured in compliance with JIS A 1108.

The amount of the autogenious shrinkage for concrete of a water cement ratio of 30%, unit water content of 175 kg/m$^3$ and unit cement content 580 kg/m$^3$ was measured through "autogenious shrinkage and self-expansion testing method for cement paste, mortar and concrete (draft)" by the Japan Concrete Institute (Corporate Body).

The cement in the material used was prepared by adding 1% of gypsum by SO$_3$ conversion to 7 sorts of clinker whose mineral compositions are shown in Table 13 (Embodiments 13 to 16 and Comparative Examples 10 to 12) and crushing the same.

As for the fineness of cement, it was set to 3,100 to 3,300 cm$^2$/g by specific surface area by blaine.

As for the fine aggregate, river sand from Yasu-river having a specific gravity of 2.59 was used.

As for the coarse aggregate, crushed stone from Takatsuki having a specific gravity of 2.70 was used.

As for the dispersing agent, FP300UB (manufactured by FPK) which is a high-range AE water reducing agent was used, and the amount of addition was set to an amount at which the slump flow value of concrete was 60±5 cm.

As for the water, city water was used.

Figure 10:
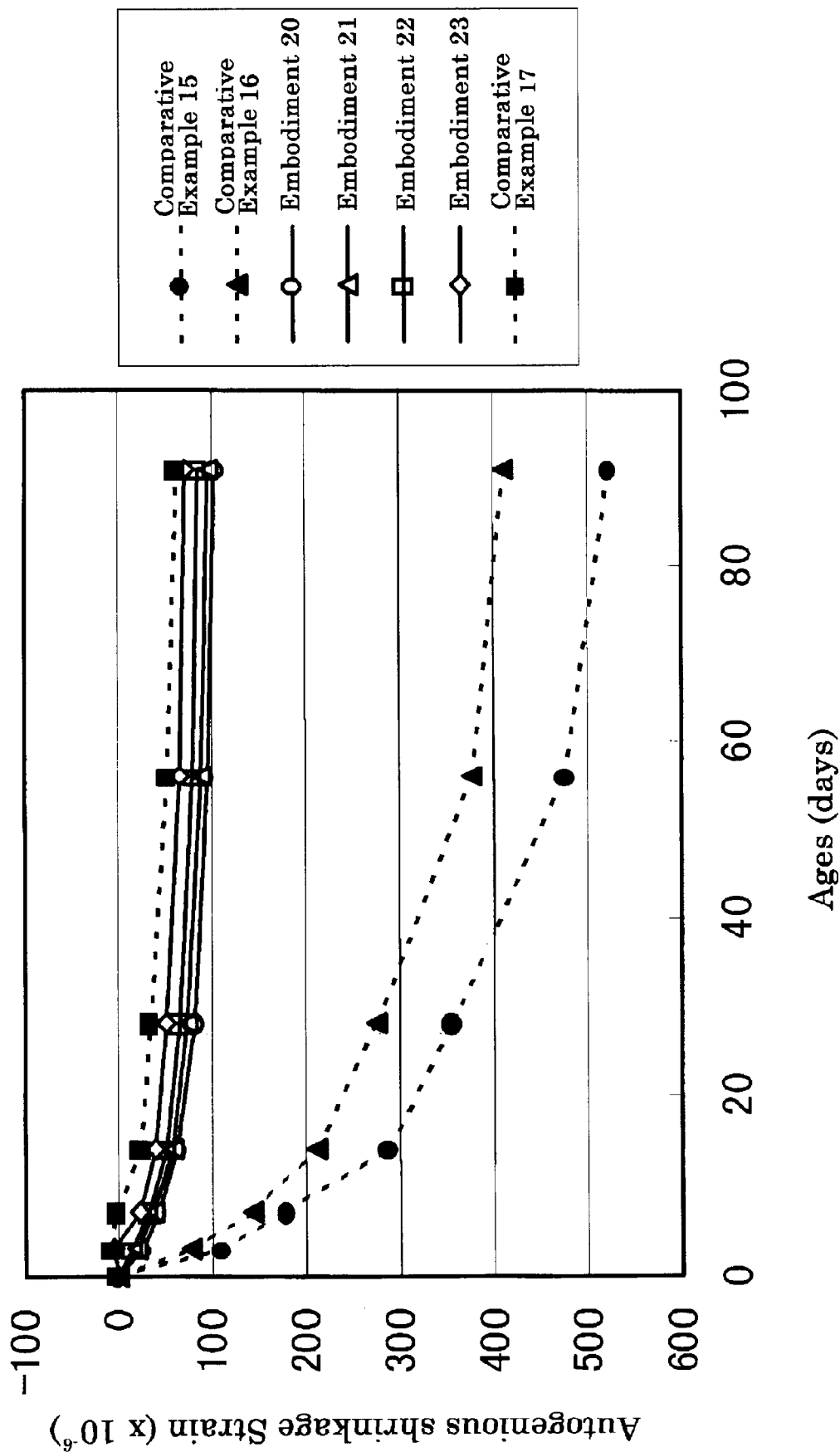
FIG. 10 is a graph showing measured results of autogenious shrinkage amounts.

The test results are shown in Table 13 and FIG. 10.

As being apparent also from Table 13, in cases of Comparative Examples 10 and 11 in which IM exceeded 0.62, the decrease of apparent viscosity was insufficient, but it could be seen that the apparent viscosity remarkably decreased in Embodiments 13 to 16 and Comparative Example 12 in which IM was not more than 0.62.

On the other hand, it has been found that, in the Comparative Example 3 in which IM was less than 0.06, the strength development was poor.

Further, as being apparent from FIG. 10, in the case of Comparative Examples 10 and 11 in which IM exceeded 0.62, the autogenious shrinkage was remarkable, but it has been found that, in each of the remaining Embodiments in which IM was not more than 0.62, the amount of the autogenious shrinkage was remarkably decreased.

TABLE 13

| W/C (%) | | Mineral Composition (% by weight) | | | Apparent Viscosity (kgf · cm · min) | Compressive Strength (N/mm$^2$) | |
|---|---|---|---|---|---|---|---|
| | | $C_3S$ | $C_2S$ | IM | | 28 days | 91 days |
| 30 | Comparative Example 10 | 36 | 46 | 1.74 | 1.76 | 80.1 | 96.5 |
| | Comparative Example 11 | 37 | 44 | 1.00 | 1.43 | 78.8 | 94.1 |
| | Embodiment 13 | 37 | 45 | 0.62 | 0.66 | 76.5 | 92.3 |
| | Embodiment 14 | 37 | 45 | 0.43 | 0.59 | 75.9 | 91.9 |
| | Embodiment 15 | 36 | 46 | 0.20 | 0.61 | 76.1 | 91.6 |
| | Embodiment 16 | 36 | 46 | 0.05 | 0.62 | 75.5 | 90.9 |
| | Comparative Example 12 | 35 | 47 | 0.02 | 0.78 | 71.2 | 83.4 |
| 25 | Comparative Example 10 | 36 | 46 | 1.74 | 2.46 | 95.3 | 112 |
| | Comparative Example 11 | 37 | 44 | 1.00 | 1.98 | 92.6 | 109 |
| | Embodiment 13 | 37 | 45 | 0.62 | 1.24 | 91.7 | 107 |
| | Embodiment 14 | 37 | 45 | 0.43 | 1.21 | 90.6 | 106 |
| | Embodiment 15 | 36 | 46 | 0.20 | 1.19 | 90.4 | 106 |
| | Embodiment 16 | 36 | 46 | 0.05 | 1.06 | 89.9 | 105 |
| | Comparative Example 12 | 35 | 47 | 0.02 | 1.27 | 81.6 | 94.4 |
| 20 | Comparative Example 10 | 36 | 46 | 1.74 | immeasurable | 113 | 132 |
| | Comparative Example 11 | 37 | 44 | 1.00 | immeasurable | 108 | 127 |
| | Embodiment 13 | 37 | 45 | 0.62 | 2.57 | 104 | 125 |
| | Embodiment 14 | 37 | 45 | 0.43 | 2.46 | 103 | 124 |
| | Embodiment 15 | 36 | 46 | 0.20 | 2.41 | 103 | 122 |
| | Embodiment 16 | 36 | 46 | 0.05 | 2.42 | 102 | 122 |
| | Comparative Example 12 | 35 | 47 | 0.02 | 2.98 | 88.4 | 97.2 |

TEST EXAMPLE 3

By using a material including cement, fine aggregate, coarse aggregate, chemical admixture and water, concrete of a water cement ratio of 25% and unit water content of 175 kg/m$^3$ was mixed by using a forced mixer with double shafts, and its compressive strength was measured in compliance with JIS A 1108.

As for the cement in the material used, 1% of gypsum by SO$_3$ conversion was added to 5 sorts of clinker whose mineral compositions are shown in Table 14 (Embodiments 17 to 19 and Comparative Examples 13 and 14) and crushing the same.

As for the fineness of cement, it was set to 3,100 to 3,300 cm$^2$/g by specific surface area by blaine.

As for the fine aggregate, river sand from Yasu-river having a specific gravity of 2.59 was used.

As for the coarse aggregate, crushed stone from Takatsuki having a specific gravity of 2.70 was used.

As for the dispersing agent, "Mighty 3000S" (manufactured by Kao Corporation) which is a high-range AE water reducing agent was used, and the amount of addition was set to an amount at which the slump flow value of concrete was 60±5 cm.

As for the water, city water was used.

Two types of curing condition of the test specimen for the compressive strength testing were prepared; a standard curing in water of 20° C., and a simplified adiabatic curing for confirming the strength after receiving thermal hysteresis in which the test specimen was laid into a styrol foam vessel of 10 cm in thickness, whose space was filled with styrol foam beads.

In the simplified adiabatic curing, measurement of the concrete temperature was also performed by using a thermocouple.

Test results are shown in Table 14.

TABLE 14

| | Mineral Composition (% by weight) | | | Maximum Temp. (° C.) | Compressive Strength (N/mm$^2$) | | | |
|---|---|---|---|---|---|---|---|---|
| | | | | | Standard Curing | | Simplified Adiabatic Curing | |
| | $C_3S$ | $C_2S$ | IM | | 28 days | 91 days | 28 days | 91 days |
| Comparative Example 13 | 50 | 31 | 0.21 | 76 | 107 | 119 | 96 | 98 |
| Embodiment 17 | 46 | 36 | 0.20 | 67 | 99 | 116 | 101 | 121 |
| Embodiment 18 | 36 | 46 | 0.19 | 60 | 91 | 111 | 96.7 | 123 |
| Embodiment 19 | 18 | 64 | 0.20 | 41 | 85 | 118 | 91.2 | 127 |

TABLE 14-continued

| | Mineral Composition (% by weight) | | | Maximum | Compressive Strength (N/mm$^2$) | | | |
|---|---|---|---|---|---|---|---|---|
| | | | | | Standard Curing | | Simplified Adiabatic Curing | |
| | C$_3$S | C$_2$S | IM | Temp. (° C.) | 28 days | 91 days | 28 days | 91 days |
| Comparative Example 14 | 11 | 70 | 0.21 | 35 | 62 | 93 | 83.5 | 97 |

As being apparent also from Table 14, there were caused no problems in the case of Embodiments 17 to 19 and Comparative Example 14 in which the amount of contained 2CaO.SiO$_2$ was not less than 35% by weight, but in the Comparative Example 13 in which this amount was less than 35% by weight, the amount of contained 3CaO.SiO$_2$ was relatively increased, and it has been found that the strength development after receiving thermal hysteresis is decreased.

On the other hand, in the case of Comparative Example 14 in which the amount of contained 2CaO.SiO$_2$ exceeded 65% by weight, the strength development speed was remarkably delayed.

TEST EXAMPLE 4

By using a material including cement, fine aggregate, coarse aggregate, chemical admixture and water, concrete of a water cement ratio of 50%, a unit water content of 175 kg/m$^3$, and unit cement content of 350 kg/m$^3$ was mixed by using a forced mixer with double shafts, the amount of adiabatic temperature rise thereof was measured by using an air-circulating type adiabatic temperature rising test apparatus, and its compressive strength was measured in compliance with JIS A 1108.

As for the cement in the material used, 1% of gypsum by SO$_3$ conversion was added to 7 sorts of clinker whose mineral compositions are shown in Table 15 (Embodiments 20 to 23 and Comparative Examples 15 to 17) and crushing the same.

As for the fineness of cement, it was set to 3,100 to 3,300 cm$^2$/g by specific surface area by blaine.

As for the fine aggregate, river sand from Yasu-river having a specific gravity of 2.59 was used.

As for the coarse aggregate, crushed stone from Takatsuki having a specific gravity of 2.70 was used.

As for the dispersing agent, "POZOLIS No.70" (manufactured by NMB) which is a high-range AE water reducing agent was used, and the amount of addition was set to be 0.25% by weight to the amount of concrete.

As for the water, city water was used.

Test results are shown in Table 15.

As being apparent also from Table 15, in cases of Embodiments 20 to 23 in which IM was not less than 0.05 and not more than 0.62, it has been found that the decrease of IM did not influence the strength development, that the amount of adiabatic temperature rise decreased, and that the strength per amount of adiabatic temperature rise became larger.

In contrast, in the case of Comparative Example 17 in which IM was less than 0.05, the strength development decreased and thus resulted in a decrease in the strength per amount of adiabatic temperature rise when using materials up to the age of 28 days.

On the other hand, in the cases of Comparative Examples 15 and 16 in which IM exceeded 0.62, the strength per amount of adiabatic temperature rise became larger.

TABLE 15

| | Mineral Composition (% by weight) | | | Amount of Adiabatic temp. Rise (° C.) | Compressive Strength (N/mm$^2$) | | | Strength per Amount of Adiabatic Temp. Rise (N/mm$^2$/° C.) | | |
|---|---|---|---|---|---|---|---|---|---|---|
| | C$_3$S | C$_2$S | IM | | 7 days | 28 days | 91 days | 7 days | 28 days | 91 days |
| Comparative Example 15 | 36 | 46 | 1.74 | 50.3 | 15.5 | 33.2 | 50.8 | 0.31 | 0.66 | 1.01 |
| Comparative Example 16 | 37 | 44 | 1.00 | 49.8 | 15.3 | 33.6 | 51.6 | 0.31 | 0.67 | 1.04 |
| Embodiment 20 | 37 | 45 | 0.62 | 47.2 | 15.1 | 33.9 | 52.3 | 0.32 | 0.72 | 1.11 |
| Embodiment 21 | 37 | 45 | 0.43 | 46.9 | 15.1 | 34.1 | 52.6 | 0.32 | 0.73 | 1.12 |
| Embodiment 22 | 36 | 46 | 0.20 | 46.2 | 14.9 | 34.0 | 52.2 | 0.32 | 0 74 | 1.13 |
| Embodiment 23 | 36 | 46 | 0.05 | 46.0 | 14.8 | 34.4 | 53.1 | 0.32 | 0.75 | 1.15 |
| Comparative Example 17 | 35 | 47 | 0.02 | 45.7 | 12.6 | 30.8 | 50.1 | 0.28 | 0.67 | 1.10 |

TEST EXAMPLE 5

By using a material including cement, fine aggregate, coarse aggregate, chemical admixture and water, concrete of a water cement ratio of 50%, a unit water content of 175 kg/m$^3$, and a unit cement content of 350 kg/m$^3$ was mixed by using a forced mixer with double shafts, the amount of adiabatic temperature rise thereof was measured using an air-circulating type adiabatic temperature rising test apparatus, and its compressive strength was measured in compliance with JIS A 1108.

As for the cement in the material used, 1% of gypsum by SO₃ conversion was added to 5 sorts of clinker whose mineral compositions are shown in Table 16 (Embodiments 24 to 26 and Comparative Examples 18 and 19) and crushing the same.

As for the fineness of cement, it was set to 3,100 to 3,300 $cm^2/g$ by specific surface area by blaine.

As for the fine aggregate, river sand from Yasu-river having a specific gravity of 2.59 was used.

As for the coarse aggregate, crushed stone from Takatsuki having a specific gravity of 2.70 was used.

As for the dispersing agent, "POZOLIS No.70" (manufactured by NMB) which is an AE water reducing agent was used, and the amount of addition was set to be 0.25% by weight to the amount of cement.

As for the water, city water was used.

Test results are shown in Table 16.

As for the fineness of cement, it was set to 3,100 to 3,300 $cm^2/g$ by specific surface area by blaine.

As for the fine aggregate, river sand from Yasu-river having a specific gravity of 2.59 was used.

As for the coarse aggregate, crushed stone from Takatsuki having a specific gravity of 2.70 was used.

As for the dispersing agent, FP300UB (manufactured by FPK) which is a high-range AE water reducing agent was used, and the amount of addition was set to an amount at which the slump flow value of concrete was 60±5 cm.

As for the water, city water was used.

The test results are shown in FIG. 10.

As being apparent also from FIG. 10, it has been found that, in the case of Comparative Examples 15 and 16 in which IM exceeded 0.62, the autogenious shrinkage was remarkable, but in each of the remaining embodiments and Comparative Example 17 in which IM was not more than

TABLE 16

|  | Mineral Composition (% by weight) | | | Amount of Adiabatic temp. Rise (°C.) | Compressive Strength (N/mm²) | | | Strength per Amount of Adiabatic Temp. Rise (N/mm²/°C.) | | |
| --- | --- | --- | --- | --- | --- | --- | --- | --- | --- | --- |
|  | $C_3S$ | $C_2S$ | IM |  | 7 days | 28 days | 91 days | 7 days | 28 days | 91 days |
| Comparative Example 18 | 46 | 36 | 0.21 | 55.2 | 18.1 | 36.4 | 51.1 | 0.33 | 0.66 | 0.93 |
| Embodiment 24 | 36 | 46 | 0.20 | 46.2 | 14.9 | 34.0 | 52.2 | 0.32 | 0.74 | 1.13 |
| Embodiment 25 | 18 | 64 | 0.20 | 32.9 | 11.1 | 32.1 | 53.8 | 0.34 | 0.98 | 1.64 |
| Embodiment 26 | 8 | 75 | 0.20 | 25.3 | 7.8 | 29.4 | 55.1 | 0.31 | 1.16 | 2.18 |
| Comparative Example 19 | 4 | 78 | 0.21 | 23.7 | 1.6 | 24.8 | 50.4 | 0.07 | 1.05 | 2.13 |

As being apparent also from Table 16, in the Comparative Example 18 in which IM was 0.2 but the amount of contained $2CaO.SiO_2$ was less than 45% by weight, it has been found that the strength development speed became faster but also resulted in a larger amount of adiabatic temperature rise, whereby the strength per amount of adiabatic temperature rise of materials more than at the age of 7 days became lower.

On the other hand, in the case of Comparative Example 19 in which the amount of contained $2CaO.SiO_2$ exceeded 75% by weight, the amount of adiabatic temperature rise became smaller but the strength development speed became slower, whereby it has been found that the strength per amount of adiabatic temperature rise of materials at the age of 7 days became remarkably lower.

TEST EXAMPLE 6

By using a material including cement, fine aggregate, coarse aggregate, chemical admixture and water, the amount of the autogenious shrinkage for concrete with a water cement ratio of 30%, a unit water content of 175 kg/m³, and a unit cement content of 580 kg/m³ was measured through "autogenious shrinkage and self-expansion testing method for cement paste, mortar and concrete (draft)" by the Japan Concrete Institute (Corporate Body).

As for the cement in the material used, 1% of gypsum by SO₃ conversion was added to 7 sorts of clinker whose mineral compositions are shown in Table 15 (Embodiments 20 to 23 and Comparative Examples 15 to 17) and crushing the same.

0.62, the amount of the autogenious shrinkage was remarkably decreased.

However, the fact that a decrease in strength development occurs in the case of Comparative Example 17 has already been explained in the above

TEST EXAMPLE 7

By using the cement of Embodiment 15 in which the amount of contained $C_3S$ is 36% by weight, the amount of contained $C_2S$ is 46% by weight, and IM is 0.20, concrete of a water cement ratio of 20% and a unit water content of 175 kg/m³ was mixed by using a forced mixer with double shafts, its apparent viscosity was measured through two-point method by employing a rotary viscometer, and its compressive strength was measured in compliance with JIS A 1108.

As for the fine aggregate, river sand from Yasu-river having a specific gravity of 2.59 was used.

As for the coarse aggregate, crushed stone from Takatsuki having a specific gravity of 2.70 was used.

As for the dispersing agent, FP300UB (manufactured by FPK) which is a high-range AE water reducing agent was used, and the amount of addition was set to an amount at which the slump flow value of concrete was 60±5 cm.

As for the water, city water was used.

As for the fly ash, the following three types were employed.

(1) Non-classified fly ash (JIS article).
(2) Classified fly ash of 30 μm.
(3) Classified fly ash of 20 μm.

As for the ground granulated blast-furnace slag, the following three types were employed.

(4) Those having a specific surface area by blaine of approximately 4,500 cm$^2$/g.
(5) Those having a specific surface area by blaine of approximately 5,000 cm$^2$/g.
(6) Those having a specific surface area by blaine of approximately 10,000 cm$^2$/g.

Embodiments 27 to 35 and Comparative Examples 20 to 32 have been set by changing types and mixing rates of chemical admixtures.

Those containing no chemical admixtures Comparative Example 20

(Cases in which the chemical admixture is fly ash)

(1)
   Mixing 10% of non-classified fly ash: Comparative Example 21
   Mixing 20% of non-classified fly ash: Comparative Example 22

(2)
   Mixing 10% of classified fly ash of 30 μm.: Comparative Example 23
   Mixing 20% of classified fly ash of 30 μm.: Comparative Example 24

(3)
   Mixing 1% of classified fly ash of 20 μm.: Comparative Example 25
   Mixing 2% of classified fly ash of 20 μm.: Embodiment 27
   Mixing 15% of classified fly ash of 20 μm.: Embodiment 28
   Mixing 25% of classified fly ash of 20 μm.: Embodiment 29
   Mixing 30% of classified fly ash of 20 μm. Comparative Example 26

(4)
   Mixing 10% of those having a specific surface area by blaine of approximately 4,500 cm$^2$/g.: Comparative Example 27
   Mixing 30% of those having a specific surface area by blaine of approximately 4,500 cm$^2$/g.: Comparative Example 28

(5)
   Mixing 5% of those having a specific surface area by blaine of approximately 5,000 cm$^2$/g.: Comparative Example 29
   Mixing 10% of those having a specific surface area by blaine of approximately 5,000 cm$^2$/g.: Embodiment 30
   Mixing 30% of those having a specific surface area by blaine of approximately 5,000 cm$^2$/g.: Embodiment 31
   Mixing 60% of those having a specific surface area by blaine of approximately 5,000 cm$^2$/g.: Embodiment 32
   Mixing 70% of those having a specific surface area by blaine of approximately 5,000 cm$^2$/g.: Comparative Example 30

(6)
   Mixing 5% of those having a specific surface area by blaine of approximately 10,000 cm$^2$/g.: Comparative Example 31
   Mixing 10% of those having a specific surface area by blaine of approximately 10,000 cm$^2$/g.: Embodiment 33
   Mixing 30% of those having a specific surface area by blaine of approximately 10,000 cm$^2$/g.: Embodiment 34
   Mixing 60% of those having a specific surface area by blaine of approximately 10,000 cm$^2$/g.: Embodiment 35
   Mixing 70% of those having a specific surface area by blaine of approximately 10,000 cm$^2$/g.: Comparative Example 32

Test results are shown in Table 17.

TABLE 17

| W/C (%) | Type of Additive | | Mixing Rate of Additive (%) | Amount of Used Dispersing Agent (C × %) | Apparent Viscosity (kgf · cm · min) | Compressive Strength (N/mm$^2$) | |
|---|---|---|---|---|---|---|---|
| | | | | | | 28 days | 91 days |
| 20 | nil | Comparative Example 20 | 0 | 1.4 | 2.41 | 103 | 122 |
| | (1) | Comparative Example 21 | 10 | 1.4 | 2.22 | — | — |
| | | Comparative Example 22 | 20 | 1.4 | 2.16 | — | — |
| | (2) | Comparative Example 23 | 10 | 1.4 | 1.98 | — | — |
| | | Comparative Example 24 | 20 | 1.4 | 1.89 | — | — |
| | (3) | Comparative Example 25 | 1 | 1.4 | 2.15 | — | — |
| | | Embodiment 27 | 2 | 1.2 | 1.24 | 100 | 123 |
| | | Embodiment 28 | 15 | 1.1 | 0.66 | 95.6 | 121 |
| | | Embodiment 29 | 25 | 1.1 | 0.62 | 88.7 | 117 |
| | | Comparative Example 26 | 30 | 1.1 | 0.58 | 84.2 | 108 |
| | (4) | Comparative Example 27 | 10 | 1.3 | 1.88 | — | — |

TABLE 17-continued

| W/C (%) | Type of Additive | | Mixing Rate of Additive (%) | Amount of Used Dispersing Agent (C × %) | Apparent Viscosity (kgf · cm · min) | Compressive Strength (N/mm$^2$) 28 days | 91 days |
|---|---|---|---|---|---|---|---|
| | | Comparative Example 28 | 30 | 1.2 | 1.82 | — | — |
| | (5) | Comparative Example 29 | 5 | 1.3 | 1.94 | — | — |
| | | Embodiment 30 | 10 | 1.3 | 1.02 | 104 | 126 |
| | | Embodiment 31 | 30 | 1.2 | 1.07 | 99.8 | 124 |
| | | Embodiment 32 | 60 | 1.1 | 0.86 | 88.7 | 122 |
| | | Comparative Example 30 | 70 | 1.1 | 0.77 | 76.5 | 106 |
| | (6) | Comparative Example 31 | 5 | 1.3 | 1.93 | — | — |
| | | Embodiment 33 | 10 | 1.5 | 0.92 | 107 | 130 |
| | | Embodiment 34 | 30 | 1.6 | 0.83 | 104 | 124 |
| | | Embodiment 35 | 60 | 1.6 | 0.67 | 98.8 | 117.6 |
| | | Comparative Example 32 | 70 | 1.6 | 0.89 | 75.3 | 101 |

As being apparent also from Table 17, in cases of Embodiments 27 to 29 in which classified fly ash of 20 μm were mixed, the apparent viscosity remarkably decreased as compared to that of Comparative Example 20 in which no chemical admixtures were mixed, of Comparative Examples 21 and 22 in which non-classified cement of fly ash were mixed, and Comparative Examples 23 and 24 in which classified fly ash of 30 μm were mixed.

Even in a case of mixing classified fly ash of 20 μm, in the case of Comparative Example 25 in which the mixing rate was less than 2%, hardly no effect of decreasing the apparent viscosity was achieved, and in the case of Comparative Example 26 in which the mixing rate exceeded 25%, the strength development was inferior.

On the other hand, when using blast-furnace slag powder, the apparent viscosity did not decrease in the cases of Comparative Examples 27 and 28 in which the specific surface area by blaine was less than 5,000 cm$^2$/g, but in the cases of Embodiments 30 to 32 and 33 to 35 in which the specific surface area by blaine was not less than 5,000 cm$^2$/g and not more than 10,000 cm$^2$/g, the apparent viscosity remarkably decreased.

Even in a case of mixing blast-furnace slag powder whose specific surface area by blaine was not less than 5,000 cm$^2$/g and not more than 10,000 cm$^2$/g, hardly no effect of decreasing the apparent viscosity was achieved in the cases of Comparative Examples 29 and 31 in which the mixing rate of the blast-furnace slag powder was less than 10%, and strength development was inferior in the cases of Comparative Examples 30 and 32 in which the mixing rate of the blast-furnace slag powder exceeded 60%.

Further, when the specific surface area by blaine of the blast-furnace slag powder exceeded 10,000 cm$^2$/g, it could be recognized a tendency in that the amount of high-range AE water reducing agent used as a dispersing agent for obtaining the equivalent slump flow rate remarkably increased.

TEST EXAMPLE 8

By using a material including cement, fine aggregate, coarse aggregate, chemical admixture and water, concrete of a water cement ratio of 20% and a unit water content of 175 kg/m$^3$ was mixed by using a forced mixer with double shafts, and its compressive strength was measured in compliance with JIS A1108.

As for the cement in the material used, 1% of gypsum by SO$_3$ conversion was added to 5 sorts of clinker whose mineral compositions are shown in Table 18 (Embodiments 36 to 40) and crushing the same.

As for the fineness of cement, it was set to 3,100 to 3,300 cm$^2$/g by specific surface area by blaine.

As for the fine aggregate, river sand from Yasu-river having a specific gravity of 2.59 was used.

As for the coarse aggregate, crushed stone from Takatsuki having a specific gravity of 2.70 was used.

As for the dispersing agent, "Mighty 3000S" (manufactured by Kao Corporation) which is a high-range AE water reducing agent was used, and the amount of addition was set to an amount at which the slump flow value of concrete was 60±5 cm.

As for the water, city water was used.

As for the chemical admixture mixed to the cement compound, 20 μm of classified cement of fly ash was used.

Two types of curing condition of the test specimen for the compressive strength testing were prepared; a standard curing in water of 20° C., and a simplified adiabatic curing for confirming the strength after receiving thermal hysteresis in which the test specimen was laid into a styrol foam vessel of 10 cm in thickness, whose space was filled with styrol foam beads.

In the simplified adiabatic curing, measurement of the concrete temperature was also performed by using a thermocouple.

Test results are shown in Table 18.

TABLE 18

| | Mineral Composition (% by weight) | | | Mixing Ratio of Additive (%) | Maximum Temp. (° C.) | Compressive Strength (N/mm$^2$) | | | |
|---|---|---|---|---|---|---|---|---|---|
| | | | | | | Standard Curing | | Simplified Adiabatic Curing | |
| | $C_3S$ | $C_2S$ | IM | | | 28 days | 91 days | 28 days | 91 days |
| Comparative Example 36 | 50 | 31 | 0.21 | 15 | 71 | 112 | 129 | 102 | 104 |
| Embodiment 37 | 46 | 36 | 0.20 | 15 | 63 | 104 | 126 | 100 | 119 |
| Embodiment 38 | 36 | 46 | 0.19 | 15 | 57 | 95.6 | 121 | 96.7 | 124 |
| Embodiment 39 | 18 | 64 | 0.20 | 15 | 38 | 83.2 | 118 | 91.2 | 127 |
| Comparative Example 40 | 11 | 70 | 0.21 | 15 | 33 | 64.6 | 96.7 | 83.5 | 101 |

As being apparent also from Table 18, a satisfactory compressive strength was obtained in each of the embodiments.

However, when the amount of contained 2CaO.SiO$_2$ was less than 35% by weight, the amount of contained 3CaO.SiO2 relatively increased, and it has been found that the strength development was slightly decreased after receiving thermal hysteresis.

Further, in cases in which the amount of contained 2CaO.SiO$_2$ exceeded 65% by weight, the strength development speed was delayed.

What is claimed is:

1. A cement clinker comprising Al$_2$O$_3$ and Fe$_2$O$_3$ wherein the weight % ratio of Al$_2$O$_3$ to Fe$_2$O$_3$ is 0.05 to 0.62, and a content of C$_3$S is at least 35%.

2. A cement comprising a cement clinker, said cement clinker including Al$_2$O$_3$ and Fe$_2$O$_3$ wherein the weight % ratio of Al$_2$O$_3$ to Fe$_2$O$_3$ is 0.05 to 0.62 and a content of C$_3$S is at least 35%.

3. The cement according to claim 2, wherein a content of 2CaO.SiO$_2$ is 35 to 75% by weight.

4. The cement according to claim 2, wherein said cement is mixed with 2 to 25% by weight of fly ash having particle size of not more than 20 μm.

5. The cement according to claim 2, wherein said cement is mixed with 10 to 60% by weight of ground granulated blast-furnace slag having specific surface area by blaine of 5,000 to 10000 cm$^2$/g.

6. A mass concrete comprising the cement according to claim 2.

7. A concrete of high strength and high flowability comprising the cement according to claim 2.

8. A concrete of high strength and high flowability comprising the cement according to claim 2 and dispersing agent.

9. The concrete of high strength and high flowability according to claim 8, wherein a water cement ratio thereof is 30% or less.

* * * * *